United States Patent
Wang

[11] Patent Number: 6,112,465
[45] Date of Patent: Sep. 5, 2000

[54] DOOR DEVICE FOR AN ELECTRIC DISCHARGING MACHINE

[76] Inventor: Shou-Nian Wang, No. 608, Chia Tyi Road, Taiping, Taichung Hsien, Taiwan

[21] Appl. No.: 09/379,733

[22] Filed: Aug. 24, 1999

[51] Int. Cl.[7] .................................................. E05D 15/58
[52] U.S. Cl. .............................................. 49/254; 312/323
[58] Field of Search .................................... 160/210, 213, 160/352; 174/66, 67; 312/322, 323, 139.1, 138.1, 326, 329; 49/254

[56] References Cited

U.S. PATENT DOCUMENTS

| | | | |
|---|---|---|---|
| 2,164,133 | 6/1939 | Efron | 312/323 X |
| 4,289,362 | 9/1981 | Kramer | 160/213 X |
| 4,600,247 | 7/1986 | Einhaus | 312/323 X |
| 4,709,972 | 12/1987 | LaBudde et al. | 312/323 X |
| 5,464,280 | 11/1995 | Runger | 312/249.11 |

*Primary Examiner*—Jerry Redman
*Attorney, Agent, or Firm*—Rosenberg, Klein & Lee

[57] ABSTRACT

A door device for an electric discharging machine includes a top board, a side board connected to an end of the top board, and a front portion pivotally connected to one of two ends of the side board. The machine has a casing which has an opening defined in the top of the casing, and an opening defined in a side of the casing. The two openings are communicate with each other. The top board and the side board are respectively slidably connected to a periphery of the two openings of the casing. Molds can be removed from or inserted into the casing via the two openings when the door device is slid away and the front portion is opened.

3 Claims, 5 Drawing Sheets

DOOR DEVICE FOR AN ELECTRIC DISCHARGING MACHINE

FIELD OF THE INVENTION

The present invention relates to a door device, and more particularly, to a door device for an electric discharging machine wherein the door is composed of two part so that the top and a side of the machine can be opened and the molds can be conveniently removed from the machine.

BACKGROUND OF THE INVENTION

A conventional electric discharging machine generally has an opening defined in the front end thereof and the other sides including the top of the machine are sealed. This is because the machine has so called EMC (ELECTROMAGNETIC COMPATIBILITY) problems so that the casing of the machine is designed to include only the front door. However, when replacing or changing molds in the machine, the operators cannot use the lifting device in the factory because there is no opening in the top of the machine so that the molds have to be moved by a forklift truck. If the space around the electric discharging machine is not large enough, the molds are moved by hands. This is a time-consuming way to change the molds and because the molds have to be inserted from the front end of the machine, the molds could hit other parts of the machine.

The present invention intends to provide a door device for an electric discharging machine wherein the door device includes two parts which respectively open the top and a side of the machine so that molds can be inserted into the machine from the top of the machine.

SUMMARY OF THE INVENTION

In accordance with one aspect of the present invention, a door device for an electric discharging machine is provided wherein the machine has a casing with a first opening defined in the top of the casing and a second opening defined in one of two sides of the casing. The first opening communicates with the second opening. The door device comprises a top board, a side board having the first end thereof connected to the first end of the top board, and a front portion pivotally connected to one of two sides of the side board. The second end of the top board is slidably connected to a periphery of the first opening, and the second end of the side board is slidably connected to a periphery of the second opening.

The object of the present invention is to provide a door device for an electric discharging machine wherein the door device can be slid to let the top and the side of the casing opened so that molds can be conveniently removed from or inserted into the machine.

Further objects, advantages, and features of the present invention will become apparent from the following detailed description with appropriate reference to the accompanying drawings.

DETAILED DESCRIPTION OF THE PREFERRED EMBODIMENT

Figure 1:
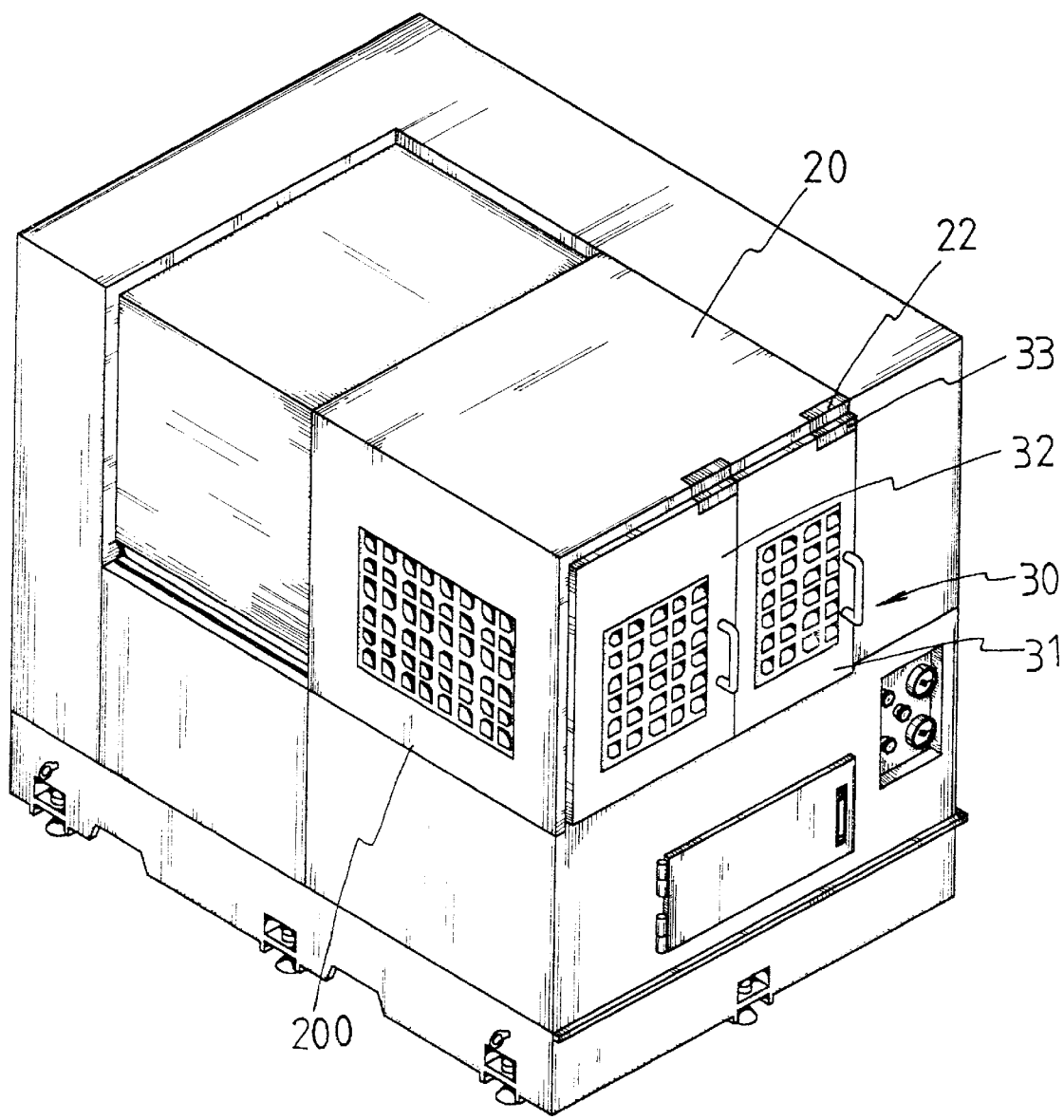
FIG. 1 is a perspective view of the door device in accordance with the present invention connected to the casing of the machine.
Figure 2:
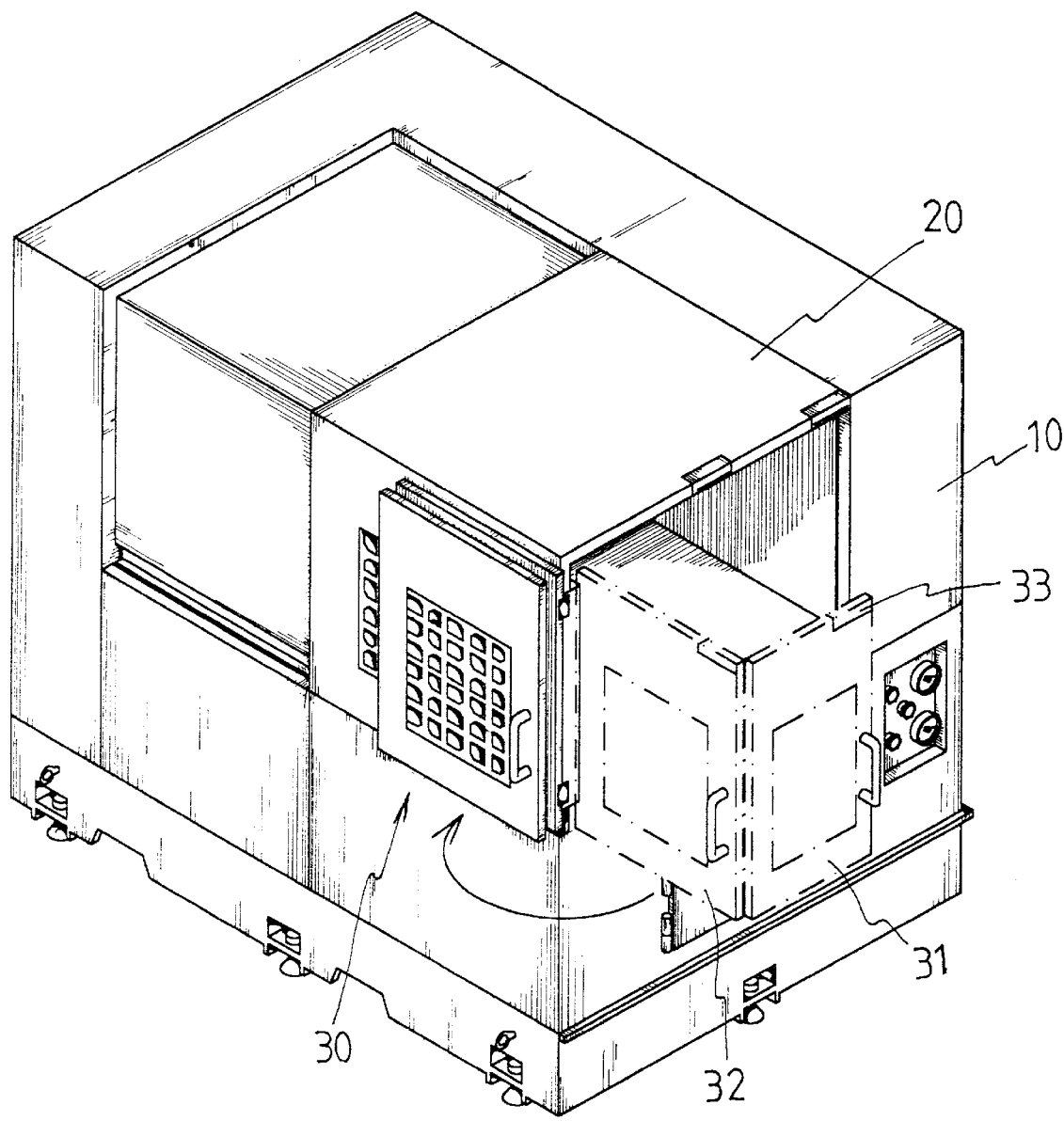
FIG. 2 is a perspective view to show the front portion of the door device in accordance with the present invention is opened.
Figure 3:
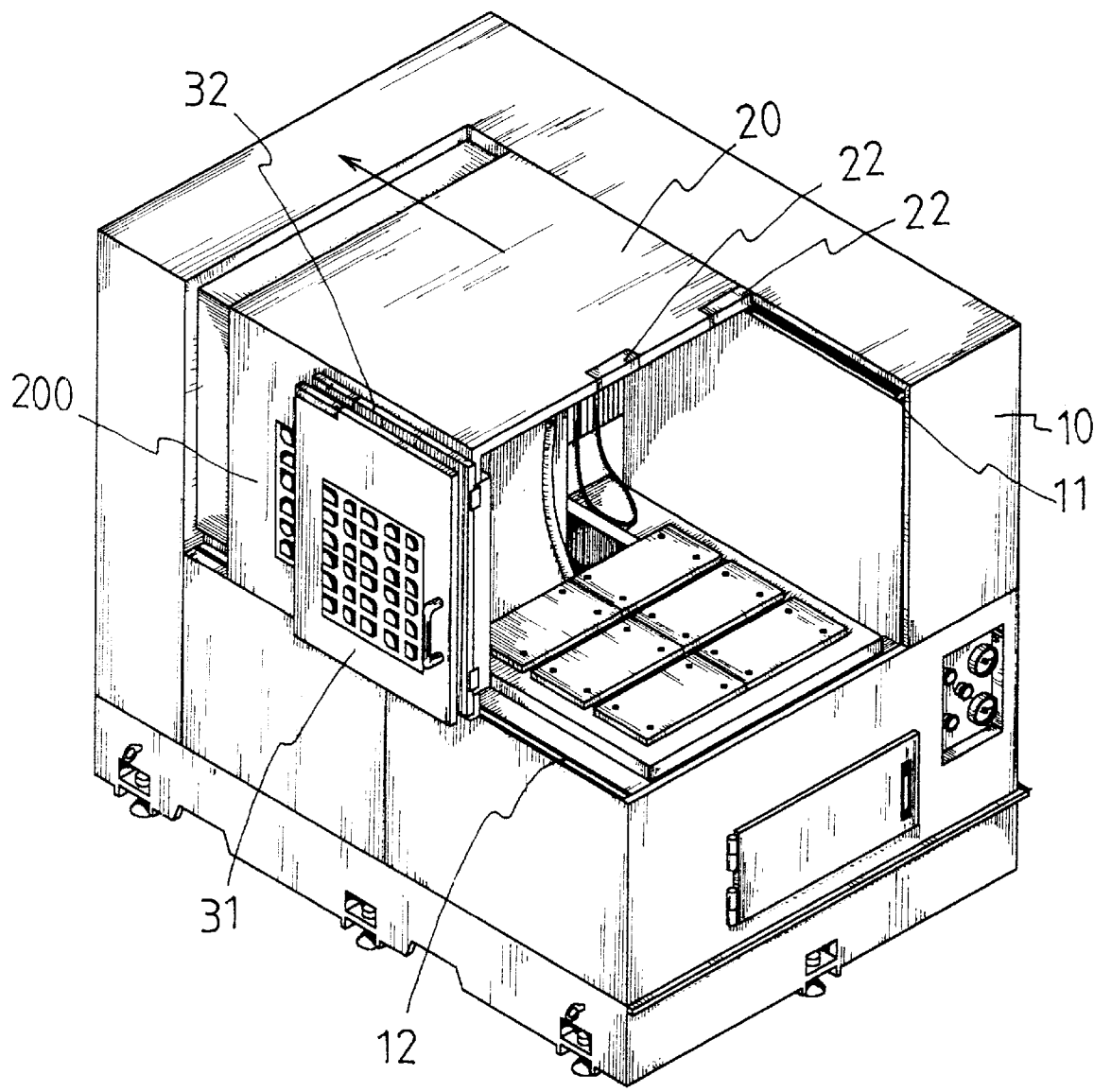
FIG. 3 is a perspective view to show the door device is slid to open the top and a side of the casing of the machine.
Figure 4:
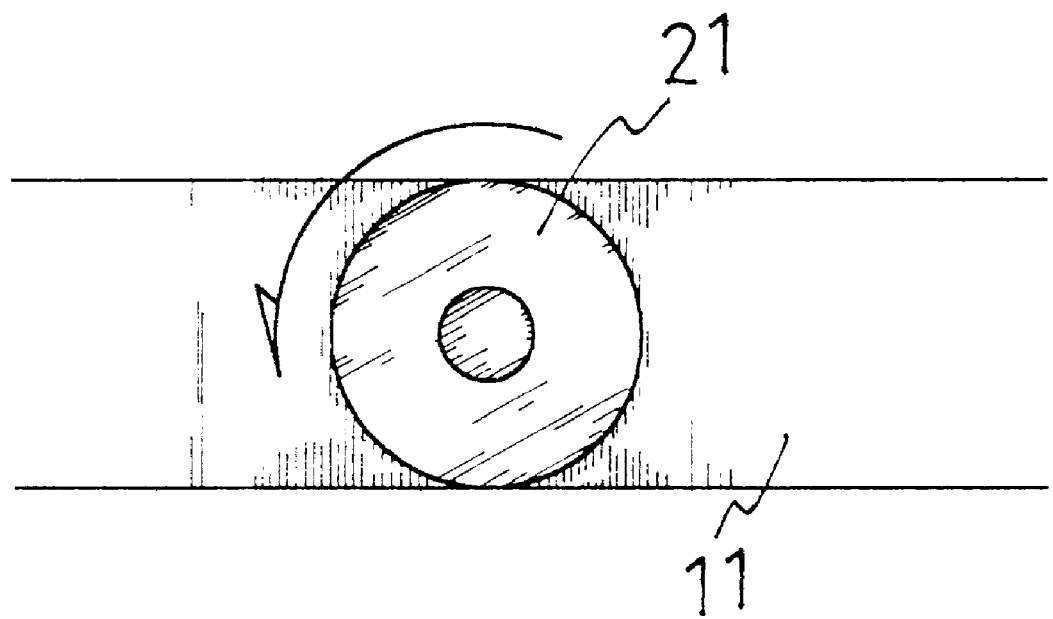
FIG. 4 is an illustrative view to show the door device has wheels rotatably received in grooves in the periphery of the opening of the casing.

Referring to FIGS. 1 to 4, an electric discharging machine has a casing 10 with a first opening defined in the top of the casing 10 and a second opening defined in one of two sides of the casing 10. The first opening communicates with the second opening. The periphery of the first opening has a groove 11 defined therein and the periphery of the second opening has another groove 12 defined therein. The door device in accordance with the present invention comprises a top board 20, a side board 200 having the first end thereof connected to the first end of the top board 20, and a front portion 30 pivotally connected to one of two sides of the side board 200. The second end of the top board 20 has wheels 21 (FIG. 4) connected thereto so as to be slidably engaged with the groove 11 in the periphery of the first opening, and the second end of the side board 200 also has wheels (not shown) so as to be slidably engaged with the groove 12 in the periphery of the second opening. Therefore, the door device can be slid to let the first opening and the second opening to be accessible.

The top board 20 has two first magnetic members 22 connected to one of two sides thereof and the front portion 30 has two second magnetic members 33 connected to one of two sides thereof so that the two first magnetic members 22 connected to the second magnetic members 33. The front portion 30 comprises a first door 31 and a second door 32 which is pivotally connected to the first door 31.

Figure 5:
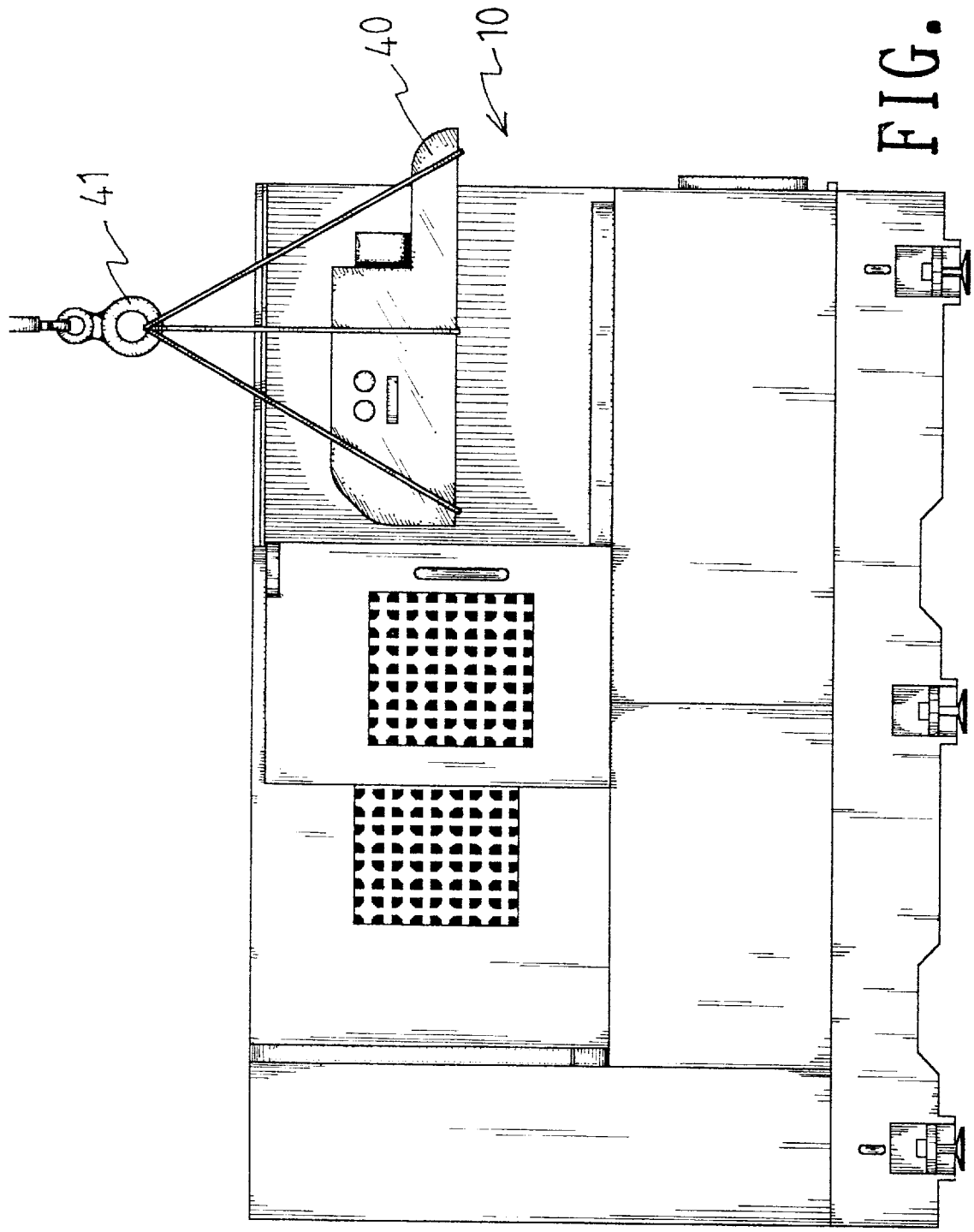
FIG. 5 is an illustrative view to show the molds are lifted by a lifting device from the interior of the machine.

Referring to FIG. 5, when changing the molds 40, a lifting device 41 can be used to hang the molds from or into the machine via the top of the machine. This is especially useful because most of the factory has lifting device 41 and by this way, the molds 40 are easily controlled and will not impact other parts of the machine.

The invention is not limited to the above embodiment but various modification thereof may be made. It will be understood by those skilled in the art that various changes in form and detail may made without departing from the scope and spirit of the present invention.

What is claimed is:

1. A door device for an electric discharging machine which has a casing with a first opening defined in a top of said casing and a second opening defined in one of two sides of said casing, the first opening communicating with the second opening, said door device comprising:

a top board, a side board having a first end thereof connected to a first end of said top board, and a front portion pivotally connected to one of two sides of said side board, a groove adapted to be defined in a periphery of the first opening and a second end of said top board slidably connected to said grove, another groove adapted to be defined in a periphery of the second opening and a second end of said side board slidably connected to said another groove.

2. The device as claimed in claim 1, wherein said top board has two first magnetic members connected to one of two sides thereof and the front portion has two second magnetic members connected to one of two sides thereof, said two first magnetic members connected to said second magnetic members.

3. The device as claimed in claim 1, wherein said front portion comprises a first door and a second door which is pivotally connected to said first door.

* * * * *